Jan. 6, 1942.  E. I. SCHWARZ  2,268,624
PACKING CUP FOR BRAKE MECHANISM
Filed March 26, 1940

INVENTOR.
ERNEST I. SCHWARZ
BY Harry Lea Dodson
ATTORNEY.

Patented Jan. 6, 1942

2,268,624

UNITED STATES PATENT OFFICE 2,268,624

PACKING CUP FOR BRAKE MECHANISM

Ernest I. Schwarz, Bronx, N. Y.

Application March 26, 1940, Serial No. 325,937

3 Claims. (Cl. 309—33)

My invention relates to that type of device used in hydraulic brake systems.

It is recognized that it is highly desirable to provide means whereby the normal size of the packing cup on its return stroke may be reduced, thus permitting an effective passage for the flow of fluid at that time. In United States Letters Patent No. 1,847,402, to Loughead, a packing cup is described as consisting of a comparatively thick disc which has a peripheral flange which abuts the wall of the cylinder and seals the same during the working stroke. On the return stroke the fluid passes through the bleed passages in the piston head. It must then flex the thick disc moving it away from the openings of these ports or passages and then it must collapse, or reduce, the flange below its normal size in order that the fluid can pass the packing cup.

Loughead recognizes that the flexibility of the cup is least at the very point the need for flexibility is greatest. He overcomes this, to a degree, by forming a continuous annular groove in the outer surface of the peripheral flange. This annular groove is connected to the face of the cup which abuts the piston head by a plurality of axial grooves which are of greater depth than the annular groove so as to supply enough volume of fluid to exert an inward radial pressure and thereby release the cup from engagement with the walls of the cylinder and thus afford a comparatively free passage of the fluid forwardly.

It will be evident that the packing cup has the least radial compressibility in the disc shaped portion at its base. The grooves which are located in the disc shaped portion on the periphery of the cup compensate for the rigidity of the cup at this point and allow fluid to pass forwardly. The flange having a greater flexibility, may be readily moved in an inward radial direction to allow the fluid to pass. The fluid upon reaching the annular groove through the grooves surrounds the entire periphery of the packing cup, exerting a radial inward pressure and assisting in releasing the cup from engagement with the walls of the cylinder to let the fluid pass forwardly. (See Loughead specification, page 2, lines 45 to 61 inclusive to which reference may be had for detailed description.)

The axial grooves preferably should register with the bleed passages to present an unrestricted passage for the fluid to traverse and reach the annular groove. This condition is seldom attained and the result is considerable turbulence is set up when the fluid leaves the bleed passages and contacts the thick disc thus putting back pressure on the fluid.

My invention has for its principal object to provide a construction which will eliminate the turbulence and afford an unobstructed egress from the bleed passages for the fluid on the return stroke of the piston.

A further object is to provide a construction which will increase the pressure exerted by the fluid so as to facilitate the collapse of the flange and release it from its engagement with the wall of the cylinder.

My means of accomplishing the foregoing objects may be more readily understood by having reference to the accompanying drawing in which.

Similar reference numerals refer to similar parts throughout the entire specification.

Figure 1:
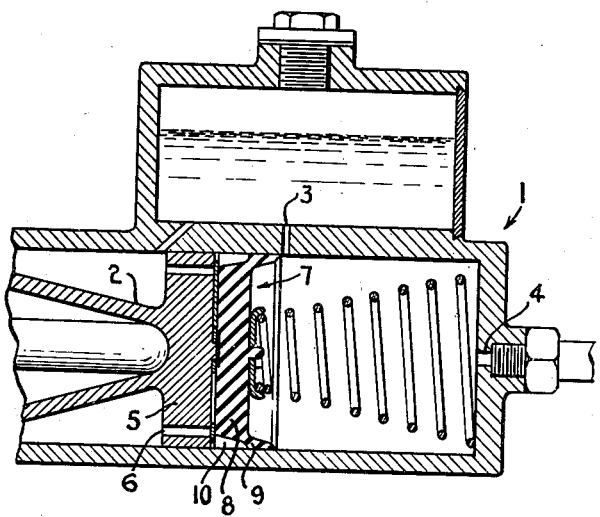
Fig. 1 is a fragmentary cross sectional view of a hydraulic brake showing my improved device assembled therein.
Figure 3:
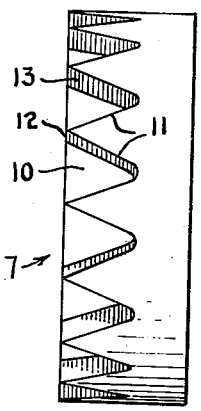
Fig. 3 is a side elevation view of my improved device.
Figure 4:
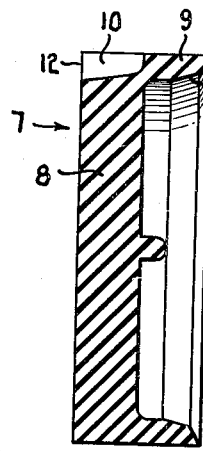
Fig. 4 is a cross section on line 4—4 of Fig. 2.
Figure 2:
Fig. 2 is a front elevation view of my improved device.

As shown in the drawing, the master cylinder 1 has piston 2 mounted for reciprocation therein. Inlet and exhaust ports 3 and 4 respectively are provided. The head 5 of the piston 2 is provided with a plurality of bleed ports or passages 6. These ports are sealed on the working stroke by a packing cup 7 preferably of rubber. The cup 7 has a relatively thick disc portion 8 and a peripheral flange 9. In the periphery of the cup and opening from the disc side I form a plurality of recesses 10. These recesses 10 are preferably triangular in plan, their adjacent bases 11 uniting to form a knife edge 12.

The result is obvious to persons skilled in the art that in this manner, regardless of at what point the bleed ports 6 register with the packing cup 7, even if the openings are opposite the edge 12, the fluid will be free to flow in to both the recesses because the knife edge will offer practically no resistance to its movement.

By converging the sides 13 of the recesses 10, the pressure exerted by the fluid will be thereby increased and the flange 9 will be more easily collapsed and so released from engagement with the walls of the cylinder. In order to impart an increased flexibility to the flange 9, it may be found desirable to taper the inner wall of the flange as at 14. This can be done without in the least degree affecting its sealing on the working stroke.

Figure 5:
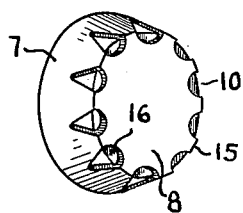
Fig. 5 is a view of a modified form.

In Fig. 5 I have shown a modified form in which the recesses 10 are extended over the edge 15 of the cup 7 and onto the face of the disc 8 forming recesses 16. The walls of the recesses 16 on face of the disc 8 are semi-circular. When this construction is employed, the walls of the recesses 10 need not come to a knife edge as the recesses 16 will afford sufficient space for the escape of the fluid from the bleed passages without creating any turbulence.

Although I have described with some degree of particularity the shape of the recesses 10, it should be clearly understood that I do not intend to be limited to the exact shape shown except as such limitations appear in the hereinafter contained claims.

Having described my invention, what I regard as new and desire to secure by Letters Patent is:

1. A packing cup for use with a piston having a plurality of bleed passages in its head, said cup abutting the head of said piston; said cup comprising a disc provided with a laterally extending peripheral flange, there being a plurality of triangular recesses formed in its surface and opening outwardly adjacent the piston head, the walls of adjacent recesses meeting to form a knife edge, the three walls of each recess converging axially to a point.

2. A packing cup for use with a piston having a plurality of bleed passages in its head, said cup abutting the head of said piston; said cup comprising a disc provided with a laterally extending peripheral flange, there being a plurality of triangular recesses formed in its surface and opening outwardly adjacent the piston head, said recesses extending onto the face of said disc, and being conical in shape.

3. A packing cup for use with a piston having a plurality of bleed passages in its head, said cup abutting the head of said piston; said cup comprising a disc provided with a laterally extending peripheral flange, there being a plurality of triangular recesses formed in the face of said disc adjacent its periphery.

ERNEST I. SCHWARZ.